United States Patent Office 3,461,211
Patented Aug. 12, 1969

3,461,211
LIPOTROPIC COMPOSITIONS AND THEIR ADMINISTRATION
Jean-Louis Auguste Delarue and Rene Louis Fallard, Paris, France, assignors to Laboratoires Toraude, Paris, France, a French society
No Drawing. Filed Jan. 19, 1965, Ser. No. 426,690
Claims priority, application France, Jan. 24, 1964, 961,420
Int. Cl. A61k *27/00;* C07c *101/12*
U.S. Cl. 424—316
2 Claims

ABSTRACT OF THE DISCLOSURE

The internal salt of carboxymethyl 2-hydroxyethyl dimethyl ammonium hydroxide exhibits lipotropic activity when administered orally to animals and humans. The substance lowers the cholesterol level and the total fatty acid content in the liver.

---

The present invention relates to new medicinal compositions having lipotropic properties, wherein the essential active ingredient is the internal salt of N-(2-hydroxyethyl)N,N-dimethyl glycine or anhydride or internal salt of the hydroxide of carboxymethyl 2-hydroxyethyl dimethyl ammonium of the following formula:

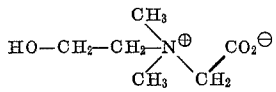

Empirical formula: $C_6H_{13}NO_3$; molecular weight: 147.16.

This salt is prepared by first reacting dimethylaminoethanol with ethyl bromacetate in absolute ethanol to form the ethyl N-bromo-N-hydroxyethyl-N,N-dimethyl glycinate:

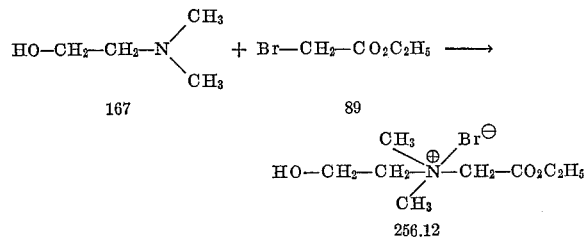

Then this intermediate compound is reacted with silver hydroxide to form the internal salt:

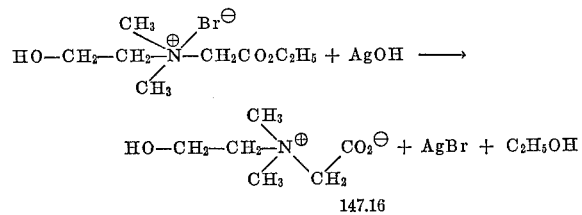

The operative method is the following:

In a 2-litre Erlenmeyer flask, 89 g. of aminoethanol are dissolved in 600 ml. of absolute ethanol. To this solution are added 167 g. (112 ml.) of ethyl bromacetate. The mixture is agitated and left in contact 24 hours. The reaction is slightly exothermic.

The reaction mixture is concentrated on a water bath under vacuum (15 mm. Hg) to dryness. The residue is then dissolved at ambient temperature in 500 ml. of distilled water and treated with a fresh suspension of silver hydroxide (about 248 g.) in 400 ml. of distilled water. The liquid is air dried.

The aqueous solution obtained is concentrated to dryness on a water bath under vacuum (15 mm. Hg). The residue is taken up in 500 ml. of absolute ethanol, treated with carbon black, filtered and left to crystallize. The air dried product is recrystallized in 400 ml. of ethanol. A yield of 90 g. (60%) of product is obtained.

The resulting product has the following physical characteristics:

Crystallizes in large transparent crystals
Melting point: 165° C.
Hygroscopic
Water-soluble, pH=7
Crystallizes in ethanol.

Its analysis is:

Percent:
  C: calculated=48.98, found=48.21
  H: calculated=8.90, found=9.05
  N: calculated=9.52, found=9.49

The internal salt of N-(2-hydroxyethyl)N,N-dimethyl glycine or anhydride or internal salt of the hydroxide of carboxy methyl 2-hydroxyethyl dimethyl ammonium, exhibits in the human clinical lipotropic properties at the level of the hepatic cell and of the vascular endothelium in making a therapeutic agent.

These properties can be made evident pharmacologically on animals in which a metabolic disturbance has been caused either by a prolonged fasting or by a lipid overburden and appearing then through a lowering of the rate of total hepatic fatty acids or through a raised percentage of lipotropic activity such as can be determined by the Draegstedt formula, or still more by the protection against chloroform poisoning.

PHARMACOLOGICAL TESTS

The comparison of the biological results given below obtained for rabbits which have received a lipid overburden following a technique described in detail in "Agressologie," 1963, IV, 45–51 in animals to which have been administered for the six days following the discontinuance of the overburden, 116 mg./kg. of the internal salt of the invention, by the oral route in suspension, containing gum arabic and in the control animals, some only having received a lipid overburden, permits the following statements:

The internal salt of the invention causes a lowering of the rate of the hepatic fatty acids.

The percentage of lipotropic activity of the internal salt of the invention is very high and superior to that of choline, as is shown by Table I which follows:

TABLE I

| | Controls | Controls having received an overburden | Internal salt of the invention | Choline |
|---|---|---|---|---|
| Total hepatic fatty acids in grams/100 grams of dry liver | 12.14±2.37 | 18.43±1.90 | 7.78±0.79 | 10.08±0.52 |
| Cold extracted hepatic lipids in grams/100 grams of dry liver | 1.21±0.049 | 2.98±0.67 | 1.62±0.12 | 1.96 |
| Percentage of lipotropic activity | | | 100 | 92.7 |

The percentage of lipotropic activity is obtained by the Draegstedt formula:

$$\text{Percent} = \frac{L-C}{S-C}$$

L being the total hepatic lipids in grams/100 grams of liver of the animals subjected to the treatment.
S being the amount obtained under the same conditions for the untreated sick animals.
C being the amount obtained under the same conditions for animals receiving a normal diet.

The comparison of the biological results hereafter obtained for rabbits in which a metabolic disturbance of endogenous origin caused by a fasting of 6 days (Armeirian, C. B. and Coll, A. J. P., 1961, 200, 75–79) effects augmentation of the hepatic biosynthesis of cholesterol in the animals to which was administered during the last three days of the tests, 116 mg./kg. by oral route of the internal salt of the invention and in the control animals, some only having been subjected to fasting, permits the following statements:

The internal salt of the invention effects a marked lowering of the rate of hepatic fatty acids. Its lipotropic percentage activity is very significant as is shown in Table II which follows:

TABLE II

|  | Controls | Controls subjected to fasting | Internal salt of the invention |
|---|---|---|---|
| Total hepatic fatty acids in grams/100 grams of dry liver | 12.14±2.37 | 19.04±1.85 | 14.19±0.40 |
| Lipotropic percentage activity |  |  | 78.8 |

The comparison of the biological results hereafter obtained on mice in which a fatty degeneration of the liver is caused by the subcutaneous injection of 1.25 ml./kg. of an oily chloroform solution (5% in arachnid oil) according to the technique of G. E. Paget, "Toxiand Applied Pharm.," 1961, 3, 595–605 in:

animals treated with the internal salt of the invention, orally at 232 mg./kg., during the preceding two days and just before the chloroform injection, then 3 and 6 hours after;

untreated animals but receiving the same injections; control animals;

enables it to be stated that the internal salt of the invention usefully protects the mice against chloroform poisoning, the percentage decrease of total hepatic lipids being 51.8% as compared with 38.1% for choline, for example, under the same experimental conditions, as is shown in Table III which follows:

TABLE III

|  | Controls | Controls+ chloroform | Internal salt of the invention | Percent decrease |
|---|---|---|---|---|
| Cold extract of hepatic lipids in grams/100 grams of dry liver | 2.47±0.20 | 19.30±0.7 | 9.30±0.93 | 51.8 |

CLINICAL TRIALS

The internal salt of the invention exerts in the human clinically useful properties notably in a dose of 4 g. per day orally in the form of hard gelatine capsules containing 500 mg. of product.

What is claimed is:
1. A method of lowering blood lipid levels which comprises orally administering to subjects requiring such a treatment, a lipotropic composition comprising a lipotropic effective amount of the internal salt of formula:

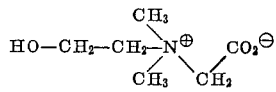

and a pharmaceutically acceptable oral vehicle.

2. A method according to claim 1, in which the lipotropic composition is administered orally in a dosage of 4 grams of said lipotropic agent daily.

References Cited

Chemical Abstracts (1957) 51: 9746 D.

ALBERT T. MEYERS, Primary Examiner
STANLEY J. FRIEDMAN, Assistant Examiner

U.S. Cl. X.R.
260—501